United States Patent [19]

Mikol

[11] Patent Number: 4,927,191
[45] Date of Patent: * May 22, 1990

[54] ADJUSTABLE TUBULAR WALL STRUCTURE FOR CONNECTORS AND THE LIKE

[75] Inventor: Erwin F. Mikol, Park Ridge, Ill.

[73] Assignee: Twenthieth Century Companies, Inc., Wheeling, Ill.

[*] Notice: The portion of the term of this patent subsequent to Jul. 11, 2006 has been disclaimed.

[21] Appl. No.: 9,671

[22] Filed: Feb. 2, 1987

Related U.S. Application Data

[63] Continuation-in-part of Ser. No. 487,865, Apr. 22, 1983, Pat. No. 4,846,510.

[51] Int. Cl.⁵ ............................................. F16L 27/00
[52] U.S. Cl. .................................. 285/226; 138/121; 285/423
[58] Field of Search ............... 92/34, 42, 47; D9/302, D9/442; 222/398, 527, 576, 526, 566; 239/33, 588; 138/121; 206/218; 285/226

[56] References Cited

U.S. PATENT DOCUMENTS

| | | | |
|---|---|---|---|
| 781,939 | 2/1905 | Fulton | 220/85 B |
| 1,804,627 | 5/1931 | Lukenbill | 222/527 |
| 1,902,323 | 3/1933 | De Monge | 92/47 |
| 3,220,544 | 11/1965 | Lovell | 206/218 |
| 3,298,575 | 1/1967 | Larsen | D9/367 |
| 3,308,599 | 3/1967 | Perlowski, Jr. | 222/527 |
| 3,313,319 | 4/1967 | Osborn et al. | 92/34 |
| 3,326,091 | 6/1967 | Allen | 92/34 |
| 3,409,224 | 11/1968 | Herp et al. | 239/33 |
| 3,549,015 | 12/1970 | Willinger | 92/34 |
| 3,699,624 | 10/1972 | De Gain | 92/34 |
| 3,929,165 | 12/1975 | Diebolt et al. | 285/226 |
| 4,081,190 | 3/1978 | Itzler | 285/354 |
| 4,084,811 | 4/1978 | Kyo | 92/34 |
| 4,216,801 | 8/1980 | Aykanian | 239/33 |
| 4,314,717 | 2/1982 | Bjurmon | 239/588 |
| 4,356,927 | 11/1982 | Cooper et al. | 239/33 |
| 4,403,709 | 9/1983 | Meins et al. | 222/527 |
| 4,428,498 | 10/1984 | Obey | 222/527 |
| 4,460,354 | 7/1984 | Wellbauser et al. | 604/73 |
| 4,593,690 | 6/1986 | Sheridan et al. | 138/173 |
| 4,629,641 | 12/1986 | Paullin | 92/34 |

FOREIGN PATENT DOCUMENTS

| | | | |
|---|---|---|---|
| 254964 | 9/1927 | Italy | 222/527 |
| 46-3726 | 1/1971 | Japan | 92/34 |
| 20863 | 2/1981 | Japan | 92/34 |

Primary Examiner—Eric K. Nicholson
Attorney, Agent, or Firm—Cook, Egan, McFarron & Manzo

[57] ABSTRACT

An adjustable tubular wall structure, which may be cylindrical or tapered, comprises a tubular body of asymmetrical accordion-folded pleats. Each pleat is defined by a thrust cone wall segment and a Belleville washer-like wall segment. The Belleville washer-like wall segments of each pleat are proportioned to be snap shifted through the articulation of the thrust cone of the next adjacent pleat, and thus shorten or lengthen the tubular body. Similar partial snap shifting of the individual Belleville washer-like wall segments provides for angulating the tubular body. The tubular structure is stable in its adjusted position, both at its ends and lengthwise of same. Tapered tubular structures may be integrally molded into a container to serve as a collapsible pouring spout.

6 Claims, 5 Drawing Sheets

ADJUSTABLE TUBULAR WALL STRUCTURE FOR CONNECTORS AND THE LIKE

This is a continuation-in-part of application Ser. No. 487,865 filed Apr. 22, 1983 now U.S. Pat. No. 4,846,510.

This invention relates to an adjustable tubular wall structure for tubular connectors, conduits, containers, and the like, and more particularly, to a pleated tubular body that is extensible, contractible, or partially extensible and/or contractible, both longitudinally and laterally thereof, and/or may be angled relative to its central axis, at one or more locations along its length, for accommodating, for instance, a connection between out of alignment discharge and intake ports or apertures in the plumbing field, and yet be stable when adjusted to define any one, some, or all of these relations.

This invention further relates to an adjustable, non-cylindrical wall structure, particularly designed for containers, which is also extensible, contractible, or partially extensible and/or contractible, both longitudinally and laterally, and/or which may be angled relative to its central axis and which may be contracted into a "nested" configuration. This non-cylindrical structure is particularly well adapted to serve as a pouring spout or other adjustable spout, or which is affixed to or connectable to a container.

It is a common problem in many fields that a tubular connector that has some degree of adjustability or adaptability must be provided to connect, for instance, spaced apart drain or duct openings or ports that are not aligned, and that are to be connected, for instance, for fluid flow from one to another or perhaps with periodic reverse flow being provided for, with the problem being commonly accommodated by providing a flexible tube or hose that may be readily flexed or shaped to accommodate the misalignment connection involved. It is often desirable that the connection forming tube be extendable or contractible lengthwise thereof to accommodate specific applications so that the connecting tube may be offered in standard lengths that have the adjustability needed to make a neat connection without requiring overlength sizes or cutting of the tubing to make the connections desired.

In the plumbing field, for instance, it is often necessary in installing drain systems to connect the drain outlet of basins or sinks for lavatories or laboratories, or the like, to traps or other sump like inlets that are not aligned with the drain outlet, and this is commonly done using tubing formed, for instance, from a suitable polyolefin, and having upper and lower straight and rigid, or relatively rigid, tubular sections that are integrally connected together by a flexible pleated section that can be extended or contracted and angled by flexing the pleated section to make the fit desired. The upper straight tubular section is secured to the basin or sink drain in some conventional seal tight manner, and the connecting tube is flexed at its pleated portion to align the lower section with the trap or the like, with excising of the lower section being effected as needed, and the lower section sealed tight connected to the trap or the like using conventional implements well known to the art. Reference may be had to Itzler U.S. Pat. Nos. 4,081,190 and 4,165,110 for examples of this type of device.

Connection implements of this type, while being flexible at the pleated section, have little or no stability at the pleated section as disposed in the adjusted relation due to the elastic memory involved in the material forming the connector. Thus, the pleated section when extended, contracted, or angled from its normal rectilinear position tends to return to its normal straight line relation, thereby subjecting the outlet or end port structures its ends are connected to, and the seals that are employed for this purpose, to undesirable localized and distorting stresses than can adversely affect the seal provided. Using a material that is freely flexible can create problems of lack of durability and corrosion resistance, and the use of semi-rigid materials, as such, to make implements of this type can result in the implement being too stiff to effectively manipulate as needed without experiencing breakage, this problem sometimes being partially alleviated by varying the thickness connector wall section along its pleated second, which greatly complicates design and production of same.

A principal object of the present invention is to provide a tubular wall structure for tubular connectors, conduiting, containers, and the like, that is in the form of a tubular body of pleated accordion fold configuration formed from a semi-rigid but resiliently flexible material of substantially uniform gauge along its length, with the tubular body being extensible and contractible or partially in either direction, and/or angled laterally for, in the case of serving as a connector, providing substantially precise adjustment to fit and make the connection desired, yet be fully stable along the length of same in its set adjusted position or contour for securement at its ends to make the connection desired free of stresses at the connected end portions involved that might otherwise be due to elastic memory or other stresses introduced into the wall structure by shaping it to fit the application that would in turn effect stress applications to such connections.

Another principal object of the invention is to provide a pleated accordion fold tubular body for use in connecting spaced apart ports, apertures, and the like for fluid flow conducting or other ducting purposes, in which the individual pleats have a pop in, pop out, relation for partially or wholly contracting and extending the tubing, or for angling the tubing ends as needed by utilizing the pop in action to partially contract or telescope one or more pleats on one side of the body so as to cant a part of the pleat to provide the angulation desired, with each such pleat being separately so cantable, and at a choice of location and adjustment of 360 degrees thereabout for maximizing precise adjustment in configuration of the tubular body as it is to be applied to make the connection desired.

Another principal object of the invention is to provide a pleated accordion fold imperforate tubular body for use in connecting apertures and ports for drain and ducting purposes, which, in addition to being extendible, contractible, and angulatable with full stability in each and all such relations, is also expandable radially of its central axis, by adjusting the tubular body to its contracted relation, which permits its use as a temporary repair for leaks in the sides of pipes or conduiting that are under low pressure conditions, by contracting the tubular body lengthwise thereof to achieve its expanding relation, applying it over the portion of the pipe or conduit having the defect, and clamping the ends of the tubular body to the exterior or the pipe conduit using conventional pipe seal clamp devices or fittings.

Still another principal object of the present invention is to provide non-cylindrical structures adapted to contract into a concentric, nesting configuration having relatively small longitudinal dimension, but adapted to be extendable to provide a tapered tubular structure which has the "pop-in/pop-out" characteristic, which allows for configuration of the non-cylindrical spout in the desired attitude. It is a further object of this invention to provide a collapsible pouring spout which is integrally molded to a container, in combination with a closure means adapted to seal within the container liquids or other pourable materials and a finger "pull tab" used to extend said spout. To remove the liquids from the container, the closure is removed, the pouring spout extended by use of the pull tab and positioned into the desired attitude and the contents of the container poured through the spout. After the desired quantity of pourable material has been poured from the container, the spout may be contracted and the closure replaced to seal the container.

Still other important objects of the invention are to provide a pleated accordion fold tubular body that is of a special asymmetrical pleated configuration, which tubular body is readily adapted for general purpose use, that is formed from a semi-rigid resiliently flexible polyolefin of substantially uniform gauge that is of film thickness proportions, which tubular body is arranged for snap action pop in and pop out contraction and extension lengthwise thereof, either on a selected pleat by pleat basis, or for all its pleats, and that also provides for partial pop-in and pop-out action of selected pleats, and positionally as selected or adjusted 360 degrees thereabout, for canting individual pleats for selected angular adjustment purposes, with the tubular body as so adjusted being fully stable in all three relations through its length, but permitting repeated similar adjustments by the user as the needs arise.

Yet other important objects of the invention are to provide a pleated accordion fold tubular body that is semi-rigid in nature, but is resiliently flexible, while providing for snap action contraction, extension, and angulation of the body for stabilized, precise fit, adjustment purposes, with full and reliable stability in any and all such relations, to provide a tubular body of the type indicated that is adapted for incorporation in a wide variety of plumbing type connection devices, as well a such diverse structures as ducting or hose lengths, containers, and arms for toy robots, and that is economical of manufacture, convenient to work with, install, use, and that is long lived in application.

In accordance with the invention, an adjustable tubular wall structure for tubular connectors, conduits, containers, and the like, is provided in which the wall structure comprises a tubular body of pleated, asymmetrical accordion fold, configuration, formed from a suitable semi-rigid resiliently flexible material (such as polypropylene) of substantially uniform gauge that may be of film thickness dimensions, that has a central axis extending centrally and longitudinally of same, of which each pleat is defined by an axially longer thrust cone wall segment and an axially shorter Belleville washer-like wall segment, in which the narrower or smaller ends of the two wall segments are integrally connected to form annular articulations therebetween and thereabout, and the wider or larger ends of the pleat Belleville washer-like wall segments are integrally connected to the wider or larger ends of the thrust cones of the next adjacent pleat, to form annular articulations therebetween and thereabout with such articulations respectively forming the roots and crowns of the pleating. The Belleville washer-like wall segments of each pleat are proportioned to be snap shifted through the articulation of same to the thrust cone wall segment of the next adjacent pleat, into internally seated relation with such thrust cone wall segment, for contracting or lengthening the tubular body after it has been contracted, with such articulation including an integral annular protuberance thereabout that controls the axial thrust needed for that purpose.

Partial snap shifting of such Belleville washer wall segments is also provided for whereby the thrust cone of the pleat is manually cantable sidewise of the tubular body by way of the resulting partial deflection of the Belleville washer wall segment of the pleat in question, into the thrust cone of the next adjacent pleat. Such canting action at the individual pleats provides a predetermined angulation of the tubular member at such pleat, with similar angulation of adjacent pleats similarly increasing the angulation provided, which may be located to be in other than in coplanar relation with the tubular body as a whole, with 360 degrees choice being provided for with regard to each pleat, either by way of direct angulation, or adjustment of same about the central axis of the tubular body.

In all these relations of the tubular body involved, namely its extended, contracted, angled, or any partially effected relation of one of these types, the tubular body is stabilized in its adjusted position at and between its ends, whereby precise adjustment lengthwise and laterally of the tubular body may be effected to make the connection desired if that is the intent of the user, with assurance that the connection providing device will remain as adjusted, and be free of unbalanced stresses between and along the ends of same.

The non-cylindrical pouring spouts which are integral to the containers and those non-cylindrical pouring spouts which are not integral may be extended, contracted, angled or positioned using the partial effects of any such relations, to provide a tapered pouring spout which is adjustable in position and which is stable in its adjusted position, not only with respect to its curvature, but with respect to its length. Accordingly, the non-cylindrical pouring spout may be positioned as desired by the user, with the assurance that the spout will remain as adjusted and be free of stresses which tend to move the spout out of the desired configuration.

Other objects, uses, and advantages will become obvious or be apparent from a consideration of the following detailed description and the application drawings in which like reference numerals indicate parts throughout the several views.

However, it is to be distinctly understood that the specific drawing illustrations provided are supplied primarily to comply with the requirements of the Patent Laws, and that the invention is susceptible of modifications and variations that will be obvious to those skilled in the art, and that are intended to be covered by the appended claims.

GENERAL DESCRIPTION

Figure 1:
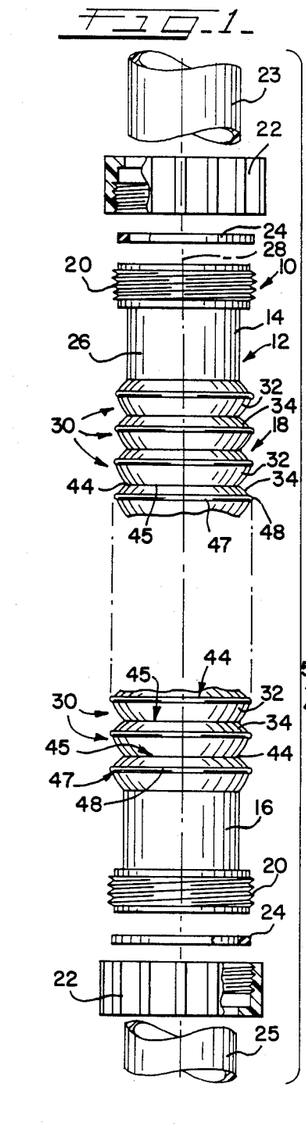
FIG. 1 is a plan view of the invention embodied in a plumbing device for connecting two pipe or conduit ends that may be aligned (as shown) or out of alignment, for connecting the pipe conduit ends for fluid flow therebetween or any other purpose, with part of the pleated section being shown broken away to simplify the drawing, and the standard nut and washer type seals employed at each end of the device (for this purpose), being shown in exploded relation and in partial section.
Figures 8, 9, 10, 11:
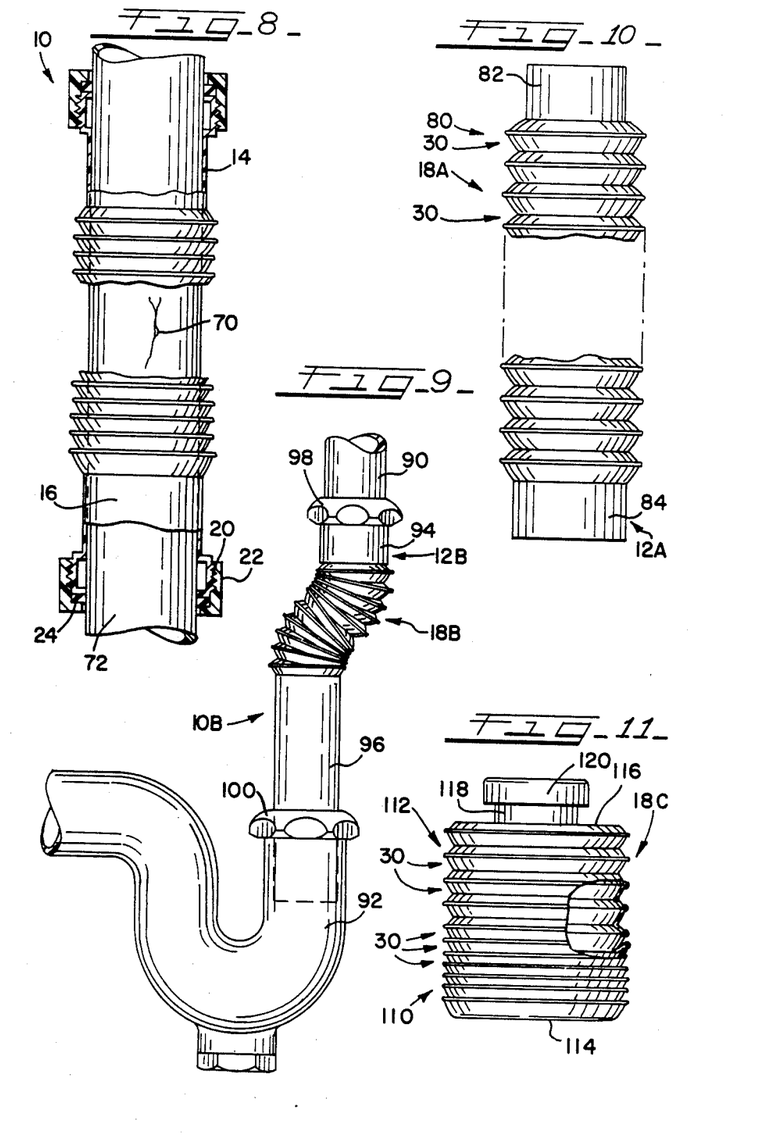
FIG. 8 is a view of the connector of FIG. 1, with the pleated section fully contracted lengthwise of same for expanding the internal diameter of the pleated section, so that the device of FIG. 1 may be applied as indicated in overlying relation to a cracked pipe, to serve as a temporary repair for same, with parts being shown in section and other parts being broken away to better illustrate the general arrangement involved.
FIG. 9 is an elevational view showing the invention applied to an alternate form of connecting device, arranged in accordance with the invention, employed to connect the outlet of a sink or lavoratory basin, namely the tailpiece of same, to a trap that is not aligned with the tailpiece.
FIG. 10 is a view similar to that of FIG. 1 illustrating the invention incorporated in a tubular body suitable for ducting or hose use.
FIG. 11 is a side elevational view, partially in section, showing a container that embodies the pleated section of the tubular body of this invention, with the container being shown in partially contracted relation.

Reference numeral 10 of FIGS. 1 and 8 generally indicates the invention incorporated in a basic connector that serves, for instance, as a plumbing tool for connecting, in drain systems the end of one pipe to the end of another pipe for, for instance, conveying fluid from one pipe to the other, and for purposes of this invention it is to be understood that the two pipe ends to be connected may be aligned as shown or out of alignment (for instance, as shown in FIG. 9) and perhaps may even be in angled relation to each other.

In the simplified tubular connector device in which the invention is embodied in the showing of FIG. 1, the device 10 comprises a tubular member or body 12 comprising straight end portions or sections 14 and 16 which are integrally connected by the special pleated section 18 that is arranged in accordance with the invention to provide for contraction, extension, and angulation of the device 10 as needed to precisely position the device for sealed connection to the pipe ends in question free of unbalanced stresses that do not contribute to the sealing action provided.

The tubular member 12 is of one piece construction and is preferably formed from a suitable polyolefin, such as polypropylene, as by employing a suitable blow-molding operation, with the end sections 14 and 16 being suitably threaded as at 20 for threadedly receiving a standard nut 22 that fits over and against a standard sealing washer 24, formed from rubber, nylon, or the like, for seal clamping the threaded end portions of the sections 14 and 16 to, for instance, the respective pipe ends 23 and 25 in the well known conventional manner (see, for instance, FIG. 8).

Figure 2:
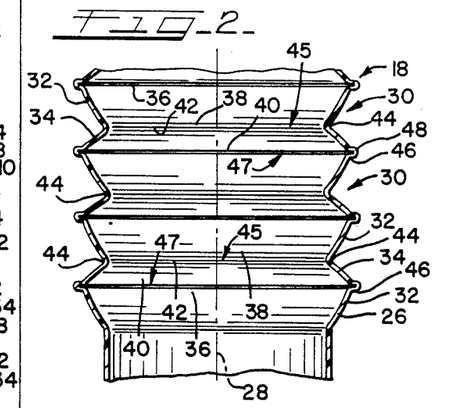
FIG. 2 is a fragmental longitudinal sectional view through the pleated section of the device of FIG. 1, but on an enlarged scale, and diagrammatically illustrating the structural arrangement of the special asymmetrical pleating involved, and when in its extended relation.

Referring to FIG. 2, and specifically to the specifics of the pleated section 18, the tubular member or body 12 of which the pleated section 18 forms a part is preferably formed from a semi-rigid resiliently flexible material of a substantially uniform gauge along the length of the tubular body 12, or at least its pleated section 18, that for many applications may be of film thickness dimensions, with the tubular body 12 defining an encompassing wall 26 of tubular configuration that extends the length of same, and having a central axis 28 extending centrally and longitudinally of same. The straight sections 14 and 16 of the specific connector 10 shown are of cylindrical configuration and are conventionally shaped so as to define the threading 20. At the pleated section 18, the wall 26, in accordance with the invention, defines individual pleats 30 that are of the accordion fold configuration, but are asymmetrical in shape, with the wall 26 in the area of the pleated section 18 being shaped to define at each pleat 30 a thrust cone wall segment 32 and a Belleville washer-like wall segment 34. As clearly brought out in FIG. 2, the thrust cone wall segment 32 and the Belleville washer-like wall segment 34 are both of frusto-conical configuration, with the individual thrust cone wall segments 32 each defining a relatively wide end portion 36 at one end of same and a relatively narrow end portion 38 at the other end of same, and the Belleville washer-like wall segments 34 each defining a relatively wide end portion 40 at one end of same, and a relatively narrow end portion 42 at the other end of same.

For each pleat 30, the wall segments 32 and 34 of same are integrally connected at their respective narrower or smaller end portions 38 and 42 to pleats 30. The wide or larger end portion 40 of each Belleville washer-like wall segment 34 is integral with the wider or larger end portion 36 of the thrust cone wall segment 32 of the next consecutive pleat 30 adjacent to it, to form the crowns 46 of the pleats, and also define radially outwardly distensible or expandable annular articulations 47 or hinged connections between the integrally connected Belleville washer-like wall segments and thrust cone wall segments, respectively.

It will be noted that when the pleated section 18 is in its rectilinear extended relation that is shown in FIGS. 1 and 2, the articulations 47 lie in a plane that extends normally of the tubular body central axis 28, and the individual pleat crowns 46 are coplanar with such plane in the case of the individual pleats 30. The articulation 45 of each pleat 30 lies in a plane, that in the rectilinear relation of the tubular body 26, is also normally disposed with respect to the central axis 28 and includes the root 44 of the respective pleats 30.

Figure 3:
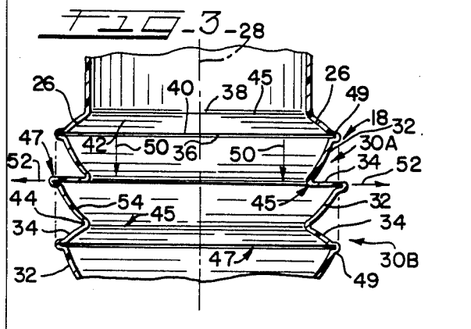
FIG. 3 is similar to FIG. 2, but shows the pleated section in the process of being contracted longitudinally of same, by snap or pop shifting of an annular wall segment of one of the pleats into socketed relation with an annular wall segment of the next succeeding pleat.
Figures 4, 5, 6, 7:
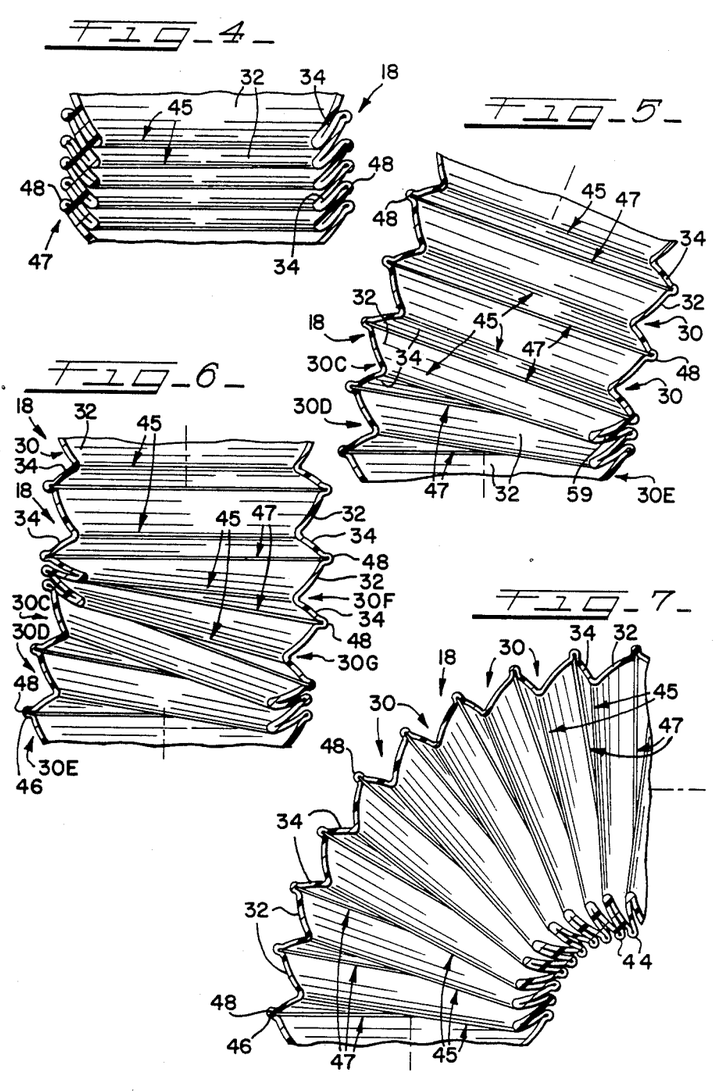
FIG. 4 is similar to FIGS. 2 and 3, but shows the pleated section of the connector with all of its pleats in the snap or pop shifted, contracted relation for shortening the connector longitudinally of same, and expanding its pleated section radially of same.
FIG. 5 is a view similar to those of FIGS. 2 and 3, but with two adjacent pleats of the pleated section shown in the half popped or snap shifted, half socketed relation that provides for angulation positioning of the pleated section.
FIG. 6 is similar to that of FIG. 5, but shows the pleated section with two pleats in half popped or snap shifted relation on one side of the connector, and two other pleats in half popped or snap shifted relation on the other side of the connector involved, for disposing the ends of the pleated section in parallel but misaligned relations.
FIG. 7 is similar to that of FIGS. 5 and 6, but shows the pleated section pleats consecutively half popped or snap fitted into socketed relation with adjacent pleats along one side of the pleated section so as to establish a 90 degree bend in the connector.

Further in accordance with the invention, the pleat crowns 46 each include an integral, externally disposed, annular rib or protuberance 48 that is in circumambient relation about the respective crowns 46, which is provided in accordance with the invention to resiliently resist distention of the crowns 46 radially outwardly of the plane of the respective crowns 46, when the tubular body 26 is to be contracted from the relation of FIGS. 1 and 2, to, for instance, the retracted relations of FIGS. 3 and 4, or vice versa. Thus, the dimensions of the annular protuberances 48 radially and longitudinally body 20 to contract or extend same, as is about to be described. The protuberances 48 actually are in the nature of hollow O-rings 49 that are open on the internal side of the tubular wall 26 and are integrally connected with the pleats 30 at and externally about their respective crowns 46.

As indicated, the pleats 30 are of asymmetrical configuration, and the thrust cone wall segments 32 have a height or depth dimension lengthwise of the axis 28 that approximates about twice the corresponding dimension of the Belleville washer-like wall segments 34. Further, in the extended relation of the pleated section 18, for each pleat 30 the thrust cone wall segments 32 at their narrower ends 38 are substantially perpendicular to the corresponding narrow ends 42 of the Belleville washer-like wall segment 34 of same (see FIG. 2). The wall segments 32 and 34, while being basically of frusto-conical configuration, are also arched somewhat spherically, as indicated in FIGS. 2 and 3, to provide each such wall segment with arch type strength or resistance against deformation or deflection, in addition to the semi-rigid nature of the material from which the wall structure 26 is formed.

A feature of the invention is that the relationship of components involved in each pleat 30 of pleated section 18 is such that the Belleville washer-like wall segment 34 of each pleat 30 may be wholly or partially snap shifted or popped across the respective articulations 47 into socketed and internally seated relation with the thrust cone wall segment 32 of the next succeeding pleat, and this being done in any manner that will subject the pleated section 18 to compressive stress acting longitudinally of its central axis 28. When this is done, where the Belleville washer-like wall segment 34 of one pleat 30, for instance, the pleat 30A of FIG. 3, is to be snap shifted into the thrust cone wall segment 32 of the next adjacent pleat 30B, the compressive forces involved act on the thrust cone 32 in question to push the Belleville washer-like wall segment 34 involved into over centered relation and into a reversely arched, socketed and internally seated, relation with the indicated next succeeding wall segment 32 of the next pleat 30B, as shown in FIG. 3A.

Figure 3A:
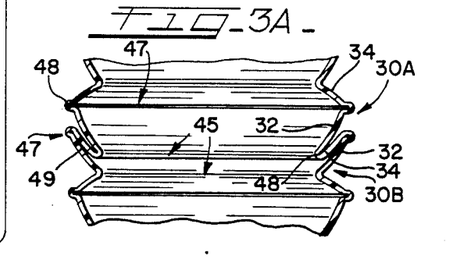
FIG. 3A is similar to FIG. 3, but shows the contracted socketed relation of the pleat shown being so processed in FIG. 3.

Thus, as indicated by the arrows 50 of FIG. 3, the tubular member or body 12 may be contracted longitudinally of its central axis 28 by pressing one of its ends toward the other end so that a thrust cone wall segment 32 of one of the pleats 30, for instance pleat 30A, acts on the Belleville washer-like wall segment 34 of that pleat, at its articulation or hinged connection 45, to shift the pleat wall segment 34 in question from its positioning indicated in FIG. 2 to the radially disposed position of FIG. 3, for the pleat 30A, in which it is in coplanar relation with the articulation 47 with the next adjacent thrust cone wall segment 32, and thence to an over or passed center relation to same, in which the acted on wall segment 34 is socketed into and seats against, as at 49, the thrust cone wall segment 32 of the next succeeding pleat 30B, as indicated in FIG. 3A. In achieving this contracted relation, insofar as the pleats 30A and 30B are concerned, the pleated section 18 is shortened or contracted approximately twice the length of the indicated wall segment 34 lengthwise of the central axis 28, and the seating of the indicated wall segment 34 against the wall segment 32 of the next succeeding pleat is against the inside surfacing 54 thereof 360 degrees thereabout, with the indicated wall segment 34 being reversibly arched, as indicated in FIG. 3A.

Generally speaking, it is immaterial which pleat 30 is acted on in this manner to shorten or contract the tubular body 26 lengthwise thereof, and where all the pleats 30 are so contracted, as suggested by the showing of FIG. 4, the tubular body 26 is shortened a corresponding amount for each pleat of the pleated section.

The tubular body 12, and namely its side wall 26 is extended from the contracted relation indicated at FIG. 4 by suitably tensioning the body 26, as by pulling the ends of same away from each other, whereby the Belleville washer-like wall segments 34 are snap shifted or popped in the reverse manner across the articulations 47 to dispose them in the extended relation of the pleats 30 that is illustrated in FIG. 2, with the length of the tubular wall increasing axially thereof approximately twice the length of the contracted wall segments 34 (axially of wall 26) that are involved. The wall segments 34 have thus been returned to their original arched relation of FIG. 2.

Further in accordance with the invention, when the tubular body 12 is in its fully contracted relation, as by the snap or pop closing of all of the pleats 30 in the manner that is indicated, the internal diameter of the body at its pleated section 18 is enlarged radially of the central axis 28. As indicated by the showing of FIG. 3, as the pleat wall segments 34 are snap shifted or popped past the articulations 47 at the pleat crowns 46, an outward distending action is effected on the pleat crowns 46, and when the wall segments 34 are socketed into the wall segment 32 of the next succeeding pleats 30, as, for instance, pleat 30B of FIG. 3, the socketed wall segments 34 are seated against the internal surfacings 54 of the wall segments 32 in question to hold the crowns 46 in a somewhat reduced but still radially enlarged relation, over that indicated in FIGS. 1 and 2. The ribs or protuberances 48 that are defined by O-rings 49 bias the pleats 30 to hold same in either the extended or contracted relation, and against the over-center pop or snap changing action that has been described and illustrated. The biasing and resistance action provided by the ribs or protuberances 48 may be adjusted by varying the proportions of same radially and axially of the wall 26, with respect to the wall segments 32 and 34 of the pleated section 18; as indicated, this controls the axially acting forces needed to contract or extend the pleated section 18.

Figure 12:
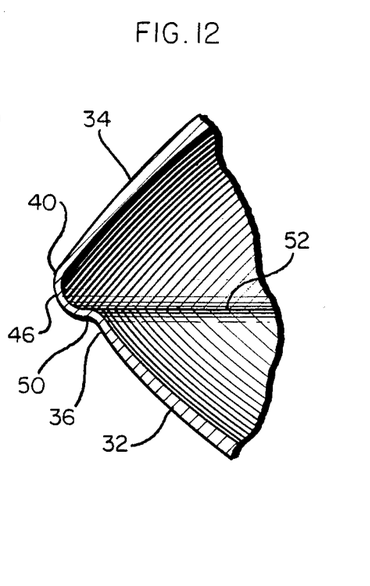
FIG. 12 is a fragmental longitudinal sectional view through a pleated section, showing a modified hinge structure and the asymmetrical nature of the hinge, in its extended relation.

In the preferred embodiment of the hinge structure shown in FIG. 12, wide end portion 36 of thrust cone 32 joins wide end portion 40 of the Belleville washer-like wall segment at the crown of the pleat 46. In this embodiment, hinging action occurs at re-entrant angle 50 which is formed during the blow molding process by which the structure is formed. The internal surface 52 of re-entrant angle 50 can be seen in FIG. 12. This structure is sometimes described as a "live hinge".

The contractibility and extensibility of the tubular member or body 12, and specifically, its pleated section 18, that has been described, provides for flexibility of the pleated section longitudinally of the tubular body 12. An additional feature of the invention is that the pleated section 18 may also be angled in a similar manner thereby providing for angling flexibility of the tubular member or body 12 even though it is formed form a semi-rigid material.

In the drawing of FIG. 5, one way of adjusting the tubular body 26 for angulation purposes is illustrated. The angulation involved is obtained by reason of the fact that for each pleat 30, the wall segments 34 thereof may be only partially socketed into the wall segment 32 of the next succeeding pleat 30, this being done by angulating the tubular body 26 so that, for instance, at a pleat 30C, the wall segment 34 at one side or section 59 of same is partially snapped across the articulation 47 connecting it to the wall segment 32 of the next succeeding pleat, for instance, the pleat 30D, to seat the indicated wall segment 32 at a relatively small area of engagement at one location along the annular internal surfacing 54 defined by the wall segment 32 in question. In such angled relation for a particular pleat 30C, the wall segment 34 is deflected toward the wall segment 32 of the next succeeding pleat 30D approximately 180 degrees thereabout to effect a predetermined amount of angulation of the tubular body 26 relative to its central axis 28, for instance, 10 degrees. By similarly socketing the wall segment 34 of the next succeeding pleat 30D into the pleat 30E, and at the same location along the circumference of side wall of the tubular body 26, so that the angle portions of same are in coplanar relation, a second angulation unit is added to the angulation, which if the parts are proportioned to give an angulation for each pleat 30 of 10 degrees, would provide a 20 degree angulation of the tubular body 26. Similarly, partially socketing adjacent pleats will provide for increased angulation, such as for the 90 degree angulation indicated in FIG. 7. The angulation may be 180 degrees or more for a particular tubular body 12 if it is provided with a pleated section 18 having the requisite number of pleats 20. The number of pleats 30 employed to define pleated section 18 of body 12 is optional and will depend, for any given structure provided with a pleated section 18 in accordance with the invention, on the use to which such structure is to be put.

The angulation provided for partial snap or pop shifting for partial socketing of the respective pleats (that has been indicated) will depend on the size of the tubing involved, and specifically, will depend on the ratio that the diameter of the pleat crown bears to the radial length of the pleat convolutions (that is, the difference between the outer diameter of the pleat crowns and the outer diameter of the pleat roots). For the proportioning of parts illustrated in FIGS. 1–7, the angulation provided per pleat partial pop or snap shift is approximately 10 degrees.

In the drawing of FIG. 6, the socketing described in connection with the showing of FIG. 5 is provided at the pleats 30C, 30D, and 30E, with a similar partial socketing being provided at the pleats 30F, 30G and 30C, but on the opposite side of the tubular body 12, which has the effect of disposing the end portions 14 and 16 of the tubular body 12 in substantially parallel but misaligned, oppositely extending relations.

In this connection, it is pointed out that with regard to the partial socketing feature of the invention that has been described, for any one pleat 30, this may be effected at any location 360 degrees thereabout, with a similar partial socketing being effected at one or more pleats 30 spaced from the partially socketed pleat in question, and at other locations 360 degrees thereabout, as desired by the user or as needed by the application. This will dispose the end of the pleated portion 18, and thus the ends of the tubular body 12, at angles relative to each other which are not coplanarly related, and which may, for instance, be angled to the front or rear of the showing of FIGS. 5 and 6, or otherwise angled, for further adjustable flexibility of the tubular body 26.

It has also been found that when one of the pleats 30 has been partially socketed for angulation purposes in the manner indicated, the thus partially socketed and angled pleat is stably held in such angled relation and it also may be swung or rotated about axis 28, and in effect rolled about the wall segment 32 into which it has been partially socketed, to dispose the angled portion of the pleated section at the desired position of angulation, with regard to the circumference of body 12. Other pleats may be similarly partially socketed and rolled 360 degrees thereabout to provide the desired positioning of the angled tubular body portions involved, to achieve multiple angular positioning of the tubular body ends.

In all of these operative relations of the pleated section 18 insofar as the body 26 is concerned, the body 12 is stable in its adjusted relation. Thus, the body 12 and specifically its pleat section 18 in its extended relation of FIGS. 1 and 2 is stable due to the special asymmetrical shaping of the pleats 30 that is involved, and particularly the wall segments 32 and 34 thereof, together with the semi-rigid nature of the material from which the tubular body 26 is formed. While the material is semi-rigid in nature, it is also resiliently flexible so that the conventional seals applied to the threaded ends 20 are effective in use in the conventional manner. However, the body 12 at its pleated section 18 has its wall segments 32 and 34 shaped and proportioned to resist the snap shifting or popping that has been referred to until adequate pressure is applied to achieve the resiliently flexible deformation or flexing that has been referred to.

In the contracted relation of the body 12, as illustrated by FIGS. 3A and 4, the socketed relation of the popped in pleats 30, and the engagement of the wall segments 34 thereof with the inner surfacings 54 of the wall segments 32 of the next succeeding pleats thereof 360 degrees thereabout, insures stability of the tubular body lengthwise and transversely of same after it has been adjusted for application purposes.

When the tubular body 12 is to be angularly related, as by employing the partial socketing relations described in connection with the drawings of FIGS. 5–7, the seating of the partially socketed wall segments 34 against the inner surfacing 54 of the wall segment 32 of the next succeeding pleat 30 provides a bracing action that together with the semi-rigid nature of the material involved, and the arched configuration of the wall segments 32 and 34, insures stability in the angled adjusted position of the tubular body 12.

It is to be understood that the basic aspects of the invention are concerned with the specific arrangement of the tubular body 12 insofar as the pleated section 18 is concerned. In practice the pleated section 18 may be incorporated in tubular bodies used for a wide variety of purposes, several of which are indicated in the drawings of FIGS. 8–11. Thus, while the pleated sections are particularly useful in connection with connecting devices employed for plumbing drain systems and other plumbing purposes, the pleated section 18 may also be employed in the form of ducting for automobile venting purposes and electrical conduit receiving purposes, hose lengths of any given standard length in which the entire length of the hose has the configuration of the pleated section 18, and as the tubular members employed to form the arms and legs of toy robots. The same pleated configuration may be employed in containers, as the side wall structure for the container, to provide a container of adjustable volume.

For connecting devices for plumbing drain system and other plumbing purposes, the gauge of the material forming the pleated section 18 should be uniform through out the axial length of same, and preferably should be in the range of from about 0.030 inch to about 0.070 inch, depending on the application (for fluid conveying purposes, body 12 should, of course, be imperforate). However, the gauge may also range from about 0.005 inch to about 0.25 for specific applications, as for instance, drains arranged as suggested in connection with the description of FIG. 11 may have a gauge at the larger end of the scale, while an appropriate polyolefin material, such as polypropylene, or a suitable metal, such as copper, may also be employed.

Also, for plumbing drain systems and other plumbing purposes, the gauge of the material at the pleated section 18 may be somewhat less than at straight sections 14 and 16, but the mass per unit length of the pleated section is preferably about equal to the mass per unit length of the straight sections, in the extended relation of the pleated section. In the fully contracted relation the pleated section will have a mass per unit length that obviously exceeds that of the straight sections because of the telescoped relation involved.

SPECIFIC DESCRIPTION

The device 10 arranged as indicated in FIG. 1 may be employed to connect adjacent ends of separate pipes together, as by selecting a device 10 of the needed length to span the gap between the pipes 23 and 25, and overlap the ends of the pipe ends to be connected, first applying the nuts 22 and the sealing washers 24 to the respective ends of the pipes (being connected) in the usual manner, and then taking the tubular body 12, adjusting it lengthwise of same and angulationwise of same so that its straight ends 14 and 16 will slip over the ends of the pipes in question, and then tightening the nuts 22 against the seals 24 utilizing the threadings 20 in the usual manner. For this purpose, the pleated section 18 is contracted, angled, and reextended as needed, following the principles described in connection with the showing of FIGS. 3–7, as needed to precisely flex the pleated section 18 of the tubular body 26 for good fitting relation with the pipe ends in question.

In the drawing of FIG. 8, the device 10 is shown employed to provide a temporary seal for a crack 70 of a plastic pipe 72. The device 10 may be used in this manner by assuming that the device 10 in question is selected in terms of size so that its internal diameter of its straight sections 14 and 16, and thus of the pleated section roots 44, is proportioned to suitably fit over pipe 72, disconnecting the pipe 72 at its closest end portion, and slipping one of the nuts 22 and the washer 24 therefor over the pipe end and beyond the crack 70, then contracting the tubular body 12 at its pleated section 18 so that all of its pleats 30 are in socketed relation, and slipping tubular body 12 as so contracted over the pipe 72 to the position indicated in FIG. 8, with its pleated section 18 in overlying relation to the crack 70, and then applying the other sealing nut 22 and seal 20 over the pipe; thereafter, the ends of device 10 are sealed to the external surface of the pipe 72 by threading the nuts 22 about the threadings 20 against the respective seals 24 in the conventional manner that is known to the art, and as shown in FIG. 8. The body 12 being imperforate in nature along its length, and the contracted relation of the pleated section 18 having the added internal radial dimensioning that has been indicated, provides for easy slipping of the tubular body 26 over the pipe 72 for application in sealing relation in the manner indicated to the crack 70. The pipe 72 open end in question may then be reconnected for continued use of the pipe 72 until permanent repairs can be made.

In the drawing of FIG. 9, the body 12B is employed to connect a standard tailpiece 90 of a sink or basin to a standard trap 92. The tubular body 2B defines plumbing connector device 10B that is of unitary blow-molded plastic tubular construction and formed from a material such as polypropylene to define an upper straight section 94 and a lower straight section 96, which are integrally connected by pleated section 18B that is arranged in accordance with the teachings of FIGS. 1–7.

The upper portion of the upper section 94 is threaded in the manner indicated for the straight sections 14 and 16 of the device 10, and thus to define the threading 20 that threadedly received the standard nut 98 which is applied against the usual sealing washer that is comparable to washer 24 (not shown). The nut 98 and the seal it bears against initially is slipped over the end of the tailpiece 90 and are followed by application of the device straight section 94 over same, after which the nut 98 is tightened on the threading of the upper section 94 to compress the washer to effect the usual seal between the section 94 and the tailpiece 90; as indicated by the showing of FIG. 9, the trap 92 is out of alignment with the tailpiece 90, and the pleated section 18B is flexed lengthwise and angularitywise for precise fit application of the device 10B to the trap 92, with the lower end of the lower section 96 being excised as needed to be received within the trap 92. Lower section 96 is equipped with a conventional sealing nut 100 and associated washer type seal (not shown but of the conventional type referred to above) for making the familiar application of same to threading at the upstanding end of the trap 92, as is well known in the art.

In the drawing of FIG. 10, the length of ducting or hose 80 is illustrated which may have any desired length, and which for its full length except at its extreme ends 82 and 84 is pleated to define the individual pleats 30 for the full length of pleated section 18A of the ducting or hosing 80 in question that is formed by body 12A. Such ducting or hose 80 may be used for any purpose that conventional ducting or hosing is currently used for, as, for instance, commonly in automobiles for venting purposes, and in buildings for air supply or discharge purposes, and for serving as garden hose or field drain pipe. For packaging purposes, the ducting or hose 80 may be contracted to a fraction of its extended relation length by disposing all of its pleats 30 in the fully socketed relation that has been described. Ends 82 and 84 may be straight sections similar to end sections 14 and 16 of device 10 for sealing type connections of the type indicated in FIGS. 1 and 8, or suitably threaded, flanged, socketed, or the like for conventional connection at their ends as needed for attaching conventional ducting, hosing, or field drain pipe to use the same.

In the drawing of FIG. 11, reference numeral 110 illustrates a container formed from polypropylene or the like to define sidewall 112 that includes pleated section 18C that extends substantially the length of the sidewall 112 and has the configuration indicated in FIGS. 2-7 for contraction and extension purposes. The container has integral bottom wall 114, an integral top wall 116 defining in the form illustrated an upstanding neck 118 to which a closure cap 120 of any suitable type may be applied. Other than the cap 120, the container 110 may be of one piece construction made by a suitable molding procedure.

The sidewall 112 of the container 110 is shown to have its several pleats 30 in extended and contracted relations at several locations along the height of the container, for varying the height or length of the container.

Alternately, the container 110 may be in the form of a relatively small cylindrical shaped can, or be proportioned similarly to the sides of the well known 55 gallon drum, with the sidewalls of same incorporating the pleated section 18 for varying the capacity of same.

The tapered spout embodiment of the invention is shown in FIGS. 13 through 18. In a first embodiment shown in FIGS. 13, 14 and 15, the container 140 is provided with an integral pouring spout 150 affixed to the upper wall 142 of container 140. Container 140 may be of any configuration and may be a conventional container. Alternatively, it may be a container of the style depicted by FIG. 11.

Figure 13:
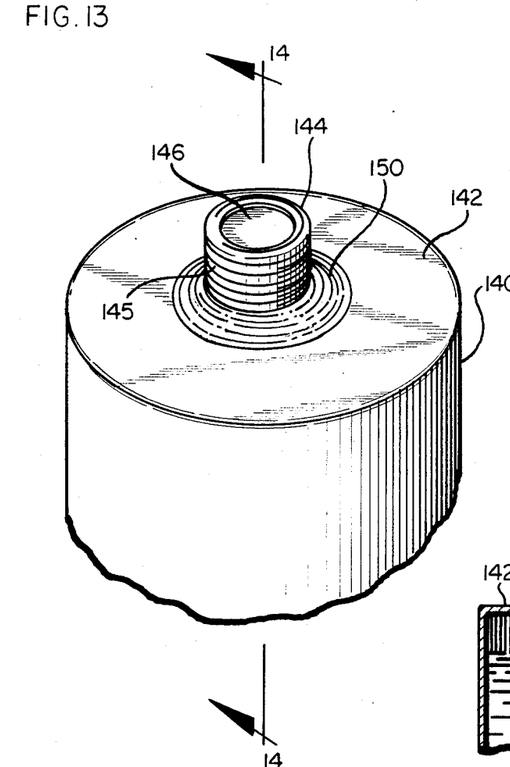
FIG. 13 is an isometric view of a container having affixed thereto a collapsible pouring spout of the present invention, wherein a closure is affixed to the narrow end of the spout, and the spout is shown in its contracted relation.
Figure 14:
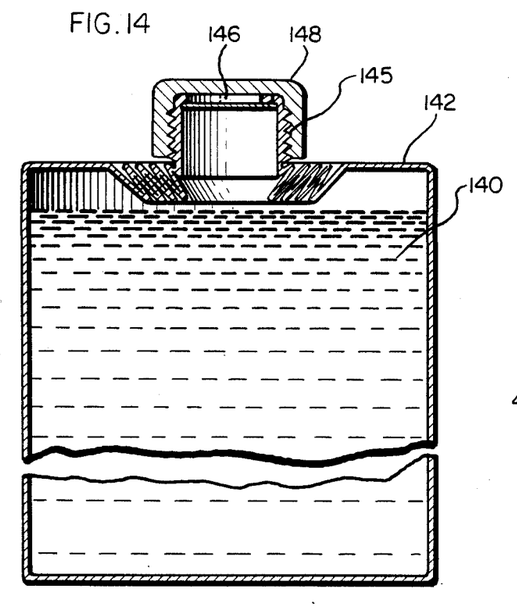
FIG. 14 is a side view, taken in section, of a container of FIG. 13 having affixed thereto a collapsible pouring spout, in its contracted relation.
Figure 15:
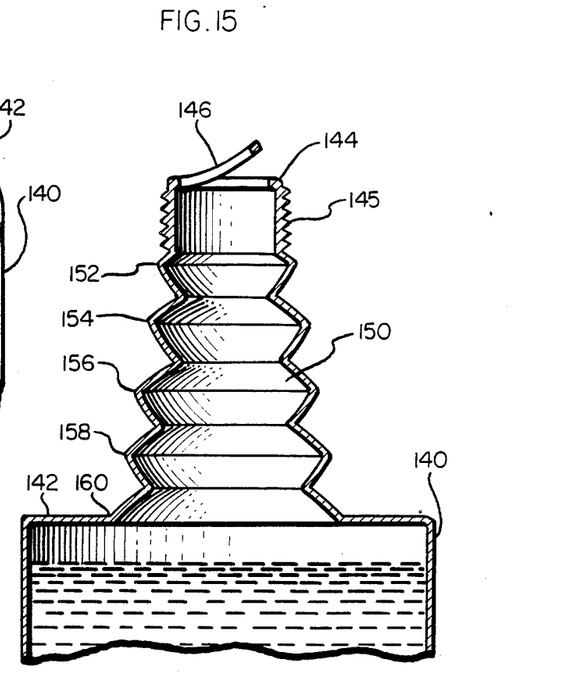
FIG. 15 is a side view, taken in section, of the container of FIG. 13, having affixed thereto a collapsible pouring spout in its extended relation.

The external (narrow) end of spout 150 is provided with neck 144 which is preferably threaded at 145 to cooperate with closure 148 to seal the container 140. Optionally, the external (narrow) end of the spout 150 may be provided with a circular pull tab through which a finger is placed to pull and extend the spout.

FIG. 14 depicts the container with the integral spout 150 in the contracted relation, concentrically nested adjacent to upper wall 142. A liquid product is illustrated within the container. In this configuration, pull tab 146 must be removed in order to extend spout 150. Accordingly, the existence of the sealed pull tab 146 or the presence of a closure 148 sealing the container effectively precludes accidental extension of pouring spout 150.

FIG. 15 illustrates the pouring spout 150 in its extended position, with pull tab 146 and closure 148 removed. As is shown in FIG. 15, the tapered spout 150 comprises a series of pleats 152 through 158, which gradually increase in diameter from the external (narrow) end toward the internal (wide) end of spout 150. The widest pleat or hinge 160 is pivotally connected to the upper wall 142 of container 140. The hinging action of pleat 160 is apparent by comparing FIG. 14 with FIG. 15. The structure of the hinges, while not apparent from FIG. 15, may be the same as the hinge structures identified as numerals 30-49 in FIGS. 1 through 3, but preferably is of the embodiment shown in FIG. 12.

Because of the "pop-in/pop-out" nature of the structure, as disclosed above, the extendable nozzle may be extended longitudinally to a length selected by the user, which position will be maintained until changed by the user. Moreover, the spout may be placed in a curved, extended position, which position will be maintained until changed by the user. After the spout has been used, it may be compacted or compressed to its original position as shown in FIG. 14, and the container resealed with closure 148.

Figure 16:
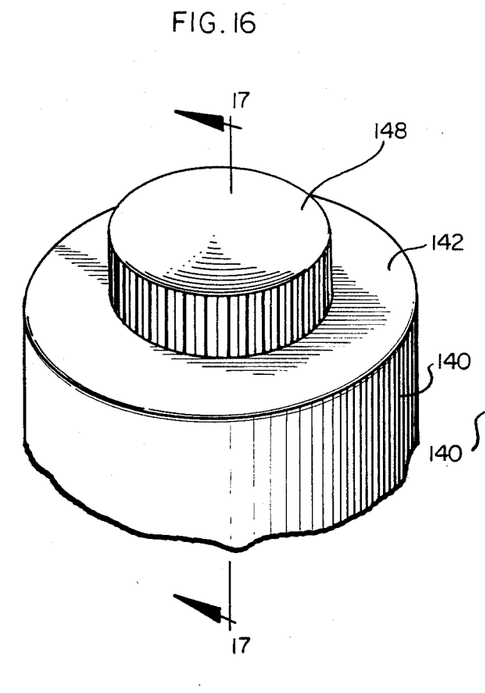
FIG. 16 is an isometric view of a container having affixed thereto a collapsible pouring spout of the present invention, wherein a closure is affixed to the neck of the container, and said spout is shown in its contracted relation.
Figure 17:
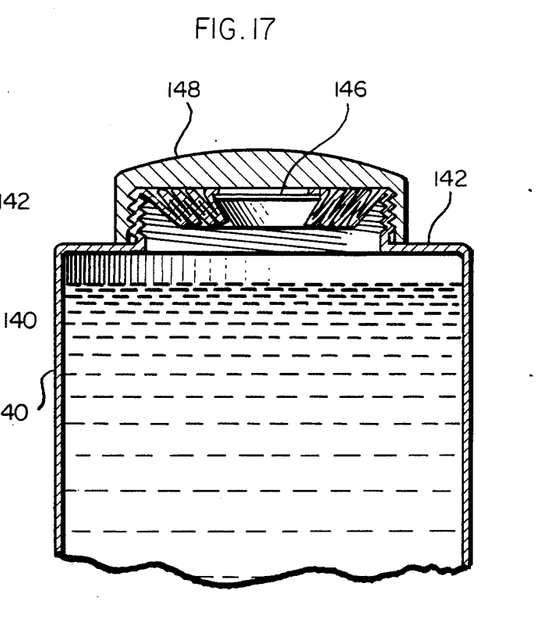
FIG. 17 is a side view, taken in section, of a container of FIG. 16 with the pouring spout in its contracted relation.
Figure 18:
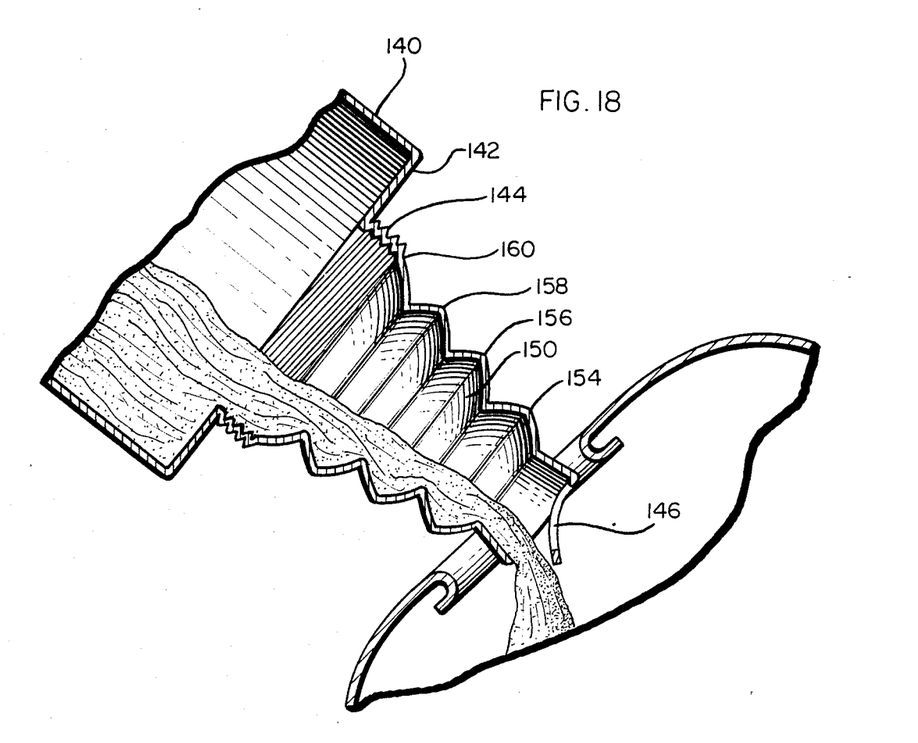
FIG. 18 is a side view of a container of FIG. 16, taken in section, with the pouring spout in its extended relation.

Another embodiment of the container with an integral spout is shown in FIGS. 16, 17 and 18. Container 140 has neck 144 affixed to its upper wall 142. Neck 144 has threads to receive a closure 148. Spout 150 is affixed to the upper end of the neck 144 at hinge 160. Optionally, the external end of spout 150 may be fitted with pull tab 146.

Those skilled in the art will be aware that the spout 150 may comprise a greater or lesser number of pleats and may have a greater or lesser taper between the diameter of the external end and the internal end. The major advantage of the taper is that when in its contracted form, the spout may assume a concentric nested configuration which requires relatively little space. The present invention thus provides a container, having an integral spout, which may be compacted for shipment, and the container with the integral pouring spout will require very little more space than a container of similar size with no spout at all. By adopting the teachings of this invention, containers having built-in spouts may be produced which are not substantially larger in height than containers with no spouts. While the containers produced in accordance with this invention may be equipped with threaded closures adapted to seal and reseal the container, such closures are not required and tear-away closures may serve as the only closure means.

The containers of the present invention may be produced by a variety of processes, including blow molding.

It will therefore be seen that the invention provides a tubular body that may serve as a connector, conduit, or container, which includes the special pleated section 18 or its equivalents having the contractible, extensible, and angularity adjustments that have been described that are effected by articulating the pleated section at the annular articulations or loci that have been described, which define the flexing loci of the device. When the device has been disposed at its pleated section to have the extended, contracted, or angled relation indicated, it is stable in all of these relations, once so adjusted by the user. The socketed relation of the pleated Belleville washer wall segments 34 into the thrust cone wall segments 32 of the next adjacent pleats, whether for full contraction purposes, or for angulation purposes, provides a bracing effect on the tubular body at the socketed area that enhances stability. For angulation purposes, the ability of the partially socketed pleats to be rotated or rocked around the axis of the tubular body for positioning it in any desired location 360 degrees thereabout, together with the indicated stability for the angles positioning of same, permits the device to have wide adaptability for connecting components that are spaced apart and misaligned, with full freedom from undesired shifting or internal bias caused by elastic memory, after the device has been adjusted as desired.

The device may be made from other polyolefin materials, such as polyvinyl chloride, and the high temperature version of same (see PVC), as well as polyethylene and the already suggested polypropylene, for instance. In a specific embodiment of the invention intended for plumbing drain system applications, the material employed is polypropylene, the gauge of the pleated section walls is 0.046 inch, the axial length of the individual pleats is 0.440 inch, the wall segments 32 and 34 are angled at 31 degrees and 52 degrees relative to the axial center line 28 of the tubular body involved, and the protuberances or ribs extend 0.046 axially of the tubular body and 0.046 radially of same.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

What is claimed is:

1. A tapered tubular wall structure for tubular conduits and the like, said wall structure comprising:
   a tapered tubular body of pleated accordion fold configuration formed from a semi-rigid resiliently flexible material of substantially uniform gauge to define an encompassing wall of tapered tubular configuration that has a longitudinal central axis extending centrally and longitudinally of same;
   said wall being formed to define along said central axis alternating thrust cone wall segments and Belleville washer-like wall segments of gradually diminishing inside and outside diameter integrally connected consecutively along the length of said pleated section;
   said thrust cone wall segments defining a wide end portion at one end and a narrow end portion at the other end, said wall segments being spherically contoured;
   said Belleville washer-like wall segments defining a wide end portion at one end and a narrow end portion at the other end, said wall segments being spherically contoured;
   with each of said pleats each comprising a thrust cone wall segment and a Belleville washer-like wall segment integrally connected at their respective narrow end portions to define annular articulations therebetween and form the roots of the pleats;
   with the wide end portion of each Belleville washer-like wall segment of each pleat being integral with the wide end portion of the thrust cone wall segment of the next consecutive pleat to form the crowns of the pleats;
   said crowns of said pleats each respectively lying in a plane that extends normally of said axis and defining a radially outwardly distensible annular articulation between the Belleville washer-like wall segment and the thrust cone wall segment, said wide ends integrally connected thereat in circumambient relation thereabout for resiliently resisting distension of said crown radially outwardly thereof in the plane of the crown;
   said Belleville washer-like wall segment of each pleat being proportioned to be wholly snap shifted through the said plane at the articulation between same and the thrust cone wall segment of the next adjacent pleat for disposing said pleats in contracted, nested relation and extended relation axially of said body;
   with the respective pleats in their extended relations each having the said thrust cone wall segment thereof disposed relative to said Belleville washer-like wall segment thereof such that said other end of said thrust cone segment is disposed substantially 90° of said other end of said Belleville washer-like wall segment thereof annularly about said root of the respective pleats;
   said proportioning of said Belleville washer-like wall segment at the respective pleats accommodating snap shifting of one side only of said other end of same through said plane thereof at the said articulation thereof within and in stabilized seating relation against the thrust cone wall segment of the said next adjacent pleat, for disposing said thrust cone wall segment thereof in angled relation to such next adjacent pleat thrust cone wall segment; and
   whereby said tubular body is stable in and may be preset, prior to use, in its said extended relation, contracted, nested relation and angled relation.

2. The structure set forth in claim 1 wherein:
   said crowns of said pleats are asymmetrical in configuration.

3. The wall structure set forth in claim 1 wherein:
   the thrust cone wall segments of each pleat are proportioned to extend axially of said central axis approximately twice the corresponding amount that said Belleville washer wall segments extend.

4. The wall structure set forth in claim 1 wherein:
   said tubular body includes a flexing loci at said roots and said crowns of said pleats with said wall segments being in thrust transmitting relation therebetween.

5. The wall structure set forth in claim 1 wherein:
   said protuberances are grooved internally of said wall structure;
   said protuberances each being of substantially like dimensions in relation to said wall structure.

6. A container having an integral, tapered pouring spout, said container comprising:
   a spout adapted to contract into a concentric nesting configuration and adapted to extend to an elongated configuration which may be positioned into selected, stable altitudes, said spout comprising:

a tapered tubular body of pleated accordion-fold configuration formed from a semi-rigid resiliently flexible material of substantially uniform gauge to define an encompassing wall of tapered tubular configuration that has a longitudinal central axis extending centrally and longitudinally of same;

said wall being formed to define along said central axis alternating thrust cone wall segments and Belleville washer-like wall segments of gradually diminishing inside and outside diameter integrally connected consecutively along the length of said pleated section;

said thrust cone wall segments defining a wide end portion at one end and a narrow end portion at the other end, said wall segments being spherically contoured;

said Belleville washer-like wall segments defining a wide end portion at one end and a narrow end portion at the other end, said wall segments being spherically contoured;

with each of said pleats each comprising a thrust cone wall segment and a Belleville washer-like wall segment integrally connected at their respective narrow end portions to define annular articulations therebetween and form the roots of the pleats;

with the wide end portion of each Belleville washer-like wall segment of each pleat being integral with the wide end portion of the thrust cone wall segment of the next consecutive pleat to form the crowns of the pleats;

said crowns of said pleats each respectively lying in a plane that extends normally of said axis and defining a radially outwardly distensible annular articulation between the Belleville washer-like wall segment and the thrust cone wall segment, said wide ends integrally connected thereat in cirumambient relation thereabout for resiliently resisting distension of said crown radially outwardly thereof in the plane of the crown;

said Belleville washer-like wall segment of each pleat being proportioned to be wholly snap shifted through the said plane at the articulation between same and the thrust cone wall segment of the next adjacent pleat for disposing said pleats in contracted, nested relation and extended relation axially of said body;

with the respective pleats in their extended relations each having the said thrust cone wall segment thereof disposed relative to said Belleville washer-like wall segment thereof such that said other end of said thrust cone segment is disposed substantially 90° of said other end of said Belleville washer-like wall segment thereof annularly about said root of the respective pleats;

said proportioning of said Belleville washer-like wall segment at the respective pleats accommodating snap shifting of one side only of said other end of same through said plane thereof at the said articulation thereof within and in stabilized seating relation against the thrust cone wall segment of the said next adjacent pleat, for disposing said thrust cone wall segment thereof in angled relation to such next adjacent pleat thrust cone wall segment; and whereby said tubular body is stable in and may be preset, prior to use, in its said extended relation, contracted, nested relation and angled relation.

* * * * *